(12) United States Patent
Bertino (10) Patent No.: US 10,849,274 B2
(45) Date of Patent: Dec. 1, 2020

(54) GRAIN THRESHING DEVICE

(71) Applicant: Indústrias Reunidas Colombo Ltda, Pindorama (BR)

(72) Inventor: Luiz Henrique Bertino, Pindorama (BR)

(73) Assignee: Indústrias Reunidas Colombo Ltda, Pindorama (BR)

( * ) Notice: Subject to any disclaimer, the term of this patent is extended or adjusted under 35 U.S.C. 154(b) by 58 days.

(21) Appl. No.: 16/257,846

(22) Filed: Jan. 25, 2019

(65) Prior Publication Data

US 2020/0236858 A1 Jul. 30, 2020

(51) Int. Cl.
| | | |
|---|---|---|
| *A01F 7/06* | (2006.01) | |
| *A01F 12/24* | (2006.01) | |
| *A01F 12/44* | (2006.01) | |
| *A01F 12/20* | (2006.01) | |
| *A01F 12/10* | (2006.01) | |

(52) U.S. Cl.
CPC ............. *A01F 7/06* (2013.01); *A01F 12/20* (2013.01); *A01F 12/24* (2013.01); *A01F 12/446* (2013.01); *A01F 12/10* (2013.01)

(58) Field of Classification Search
CPC .. A01F 7/06; A01F 12/20; A01F 12/24; A01F 12/446; A01F 12/10; A01F 12/46; A01D 45/023; A01D 45/025; A01D 61/008; A01B 51/026
See application file for complete search history.

(56) References Cited

U.S. PATENT DOCUMENTS

| | | | | |
|---|---|---|---|---|
| 4,291,709 | A | 9/1981 | Weber et al. | |
| 7,908,835 | B2 * | 3/2011 | Bertino | A01D 29/00 460/59 |
| 10,506,769 | B2 * | 12/2019 | Bertino | A01B 69/008 |
| 2013/0337876 | A1 * | 12/2013 | Johnson | A01F 12/18 460/66 |
| 2015/0237805 | A1 * | 8/2015 | Suen | A01F 12/22 460/16 |
| 2016/0007537 | A1 * | 1/2016 | Dilts | A01D 41/1243 460/112 |

(Continued)

FOREIGN PATENT DOCUMENTS

| | | |
|---|---|---|
| BR | 102016015882 A2 | 1/2017 |
| BR | 102016009856 A2 | 11/2017 |

*Primary Examiner* — Abigail A Risic
(74) *Attorney, Agent, or Firm* — McKee, Voorhees & Sease, PLC (57) ABSTRACT

The present application refers to a device designed to thresh agricultural products. The agricultural products it is designed to process include grains in general, particularly peanuts and beans, but not limited thereto, and can be applied to other similar crops. The device includes a cylinder (1) that has a larger diameter zone (2) and smaller diameter zone (3), the larger or smaller diameter zones intermediated by a transition zone (4); in the smaller diameter zone (3) the helical path is contoured by rigid scale-like components (6) as far as part of the transition zone (4), where flexible elements are applied (7) following the entire length of the larger diameter zone (2), completing the (1) cylinder or rotor, and the flexible elements (7) can be arranged in consecutive way or interspersed, so that the interval between the flexible elements (7) is intermediated by substantially upside-down U-shaped elements (7B).

6 Claims, 8 Drawing Sheets

(56) References Cited

U.S. PATENT DOCUMENTS

| | | | |
|---|---|---|---|
| 2016/0262309 A1* | 9/2016 | Regier | A01F 12/22 |
| 2017/0013781 A1* | 1/2017 | Flickinger | A01F 12/24 |
| 2017/0099776 A1* | 4/2017 | Ricketts | A01F 12/20 |
| 2017/0339832 A1* | 11/2017 | Matousek | A01F 12/181 |
| 2018/0027737 A1* | 2/2018 | Bojsen | A01F 7/06 |
| 2019/0174677 A1* | 6/2019 | Ricketts | A01F 29/04 |
| 2019/0183056 A1* | 6/2019 | Vergara | A01D 34/828 |
| 2019/0191628 A1* | 6/2019 | Graham | A01D 29/00 |

* cited by examiner

GRAIN THRESHING DEVICE

FIELD OF THE INVENTION

The present application for patent of invention refers to a device designed to thresh agricultural products. The agricultural products it is designed to process include grains in general, particularly peanuts and beans, but not limited thereto, and can be applied to other similar crops. It is envisaged that said device should be applied to grain harvesters, being situated in the mechanical engineering and agronomy segments.

STATE OF THE ART

Currently in the state of the art, there are cleaning and grain separating devices used by grain harvesters, which are mounted on the machine body to sort the grain. These devices consist of a rotating element called rotor, which acts on a sieve also known as concave. They can be distinguished by the layout of the device in relation to the flow of processed material.

When said device is oriented longitudinally to the flow of material, or the material follows in the direction of the rotating shaft, it is called axial flow. In contrast, when the device is oriented transversely to the flow of material, it is called radial.

These devices are described in detail in the following documents: U.S. Pat. No. 4,291,709; BR 102016015882-6 A2; and BR 102016009856-4 A2.

Document U.S. Pat. No. 4,291,709, filed on Sep. 29, 1981, describes an axial flow rotor. In particular, it discloses an axial flow having at least a threshing and separating unit disposed axially, which includes elements positioned to act together to thresh and sort the harvested material and feeding means forwardly, providing an improved feed ramp that forms a thinning chamber to facilitate the radial transmission of the motion to the harvested material while it is fed into the threshing rotor.

Document BR 102016015882-6 A2, filed on Jul. 7, 2016 and published on Jan. 24, 2017, presents an enhancement to the rotor system to solve some problems related to wear of the concave and clogging in the transition region of the rotor.

Another improvement to the system is proposed in document BR 102016009856-4 A2, filed on May 2, 2016 and published on Nov. 7, 2017, which describes a system for regulating control by section, of the position of the concave relative to the rotor, designed to provide adjustments, in a practical and easy manner, for different use conditions.

Problems and Shortcomings of the State of the Art Solved by the Invention

The axial flow threshing systems (rotor, concave) are composed of solid and rigid elements, usually metal, that can cause the threshing and damage the grain. There is also a difficulty in controlling and adjusting the system, which proves unsatisfactory through the position of the concave relative to the rotor. The approximation of the concave to the rotor can cause damage and losses if certain system limits are not respected. There is also a limit to the rotation of the rotor, and losses may occur if it spins at a speed above this limit.

General Description of the Invention

The invention essentially comprises a grain threshing device composed of a threshing cylinder endowed with helicoid having a segmented and overlapping profile, and interchangeable flexible elements. This cylinder which is rotated on a semi-cylindrical shaped sieve is also known as concave. The system is equipped with manual or semi-automatic adjustment for controlling the progress of the axial flow on the sieve.

Objectives of the Invention

It is an objective of the present proposal, substantiated in this application for patent of invention, to provide an alternative system to the current state of the art for grain harvesting that is easy and practical to adjust, without neglecting the quality of harvested grains.

Advantages of the Invention

In addition to the obvious advantages in the preceding description, the following advantages are highlighted:
Threshing system with rotor, wherein the helicoid consists of rigid components with fish scale-type geometry and flexible material, which maintains the integrity of the grains threshed and minimizes grain damage;
Speed regulating system of the threshing flow through the advance or retreat of fins on the rotor, the function of which is to retain more or less threshed material, depending on the crop conditions, and to enable the system to adapt better to the varied harvesting conditions. This control can be manual, mechanic or by means of a hydraulic or electric actuator etc.

DESCRIPTION OF DRAWINGS

The invention will now be described in an embodiment form, and, for improved understanding, references will be made to the accompanying drawings, in which the following are represented.

DETAILED DESCRIPTION OF THE INVENTION

Figure 4:
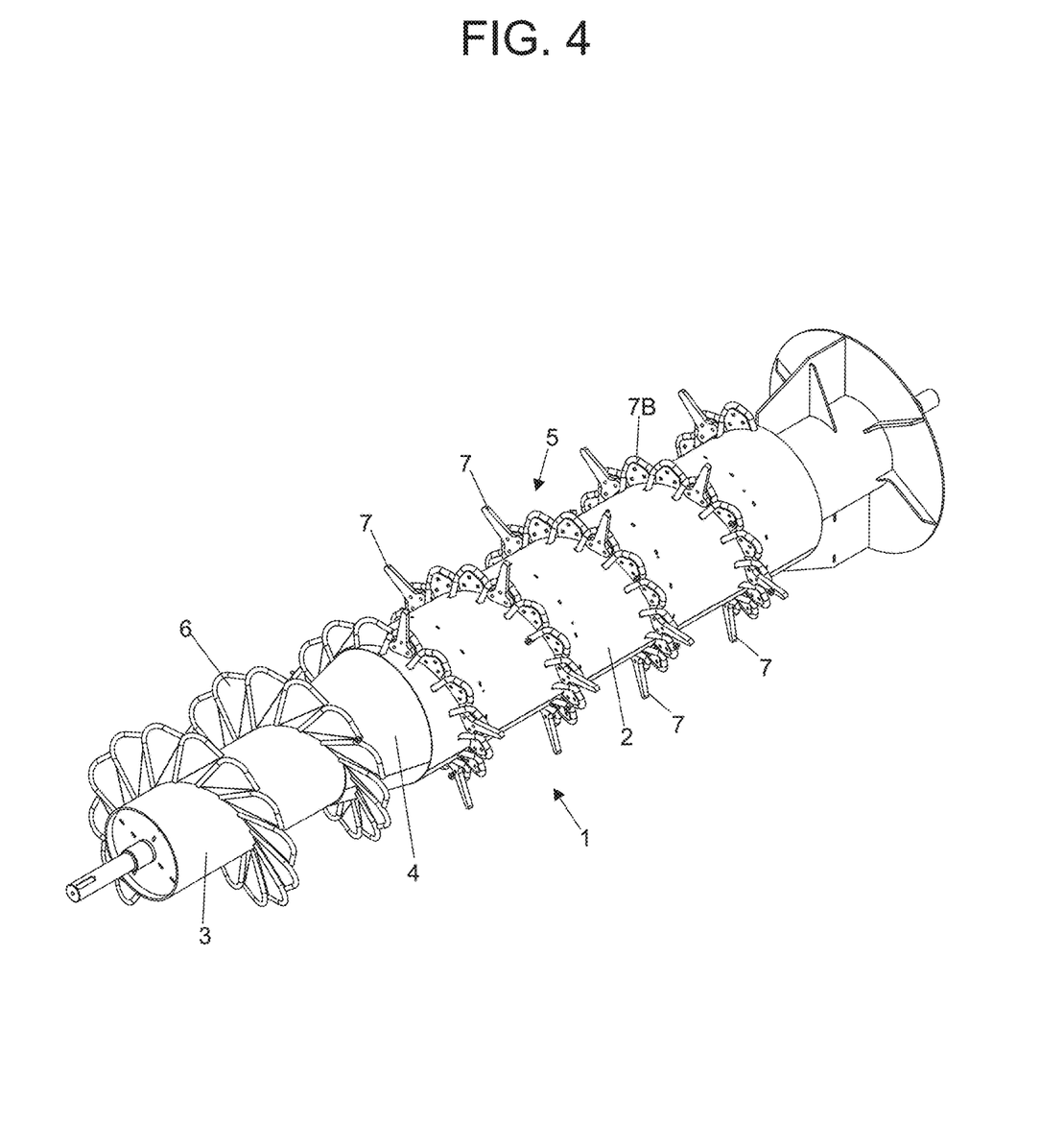
FIG. 4: perspective view of the threshing cylinder with details of the cylinder components details.
Figure 5:
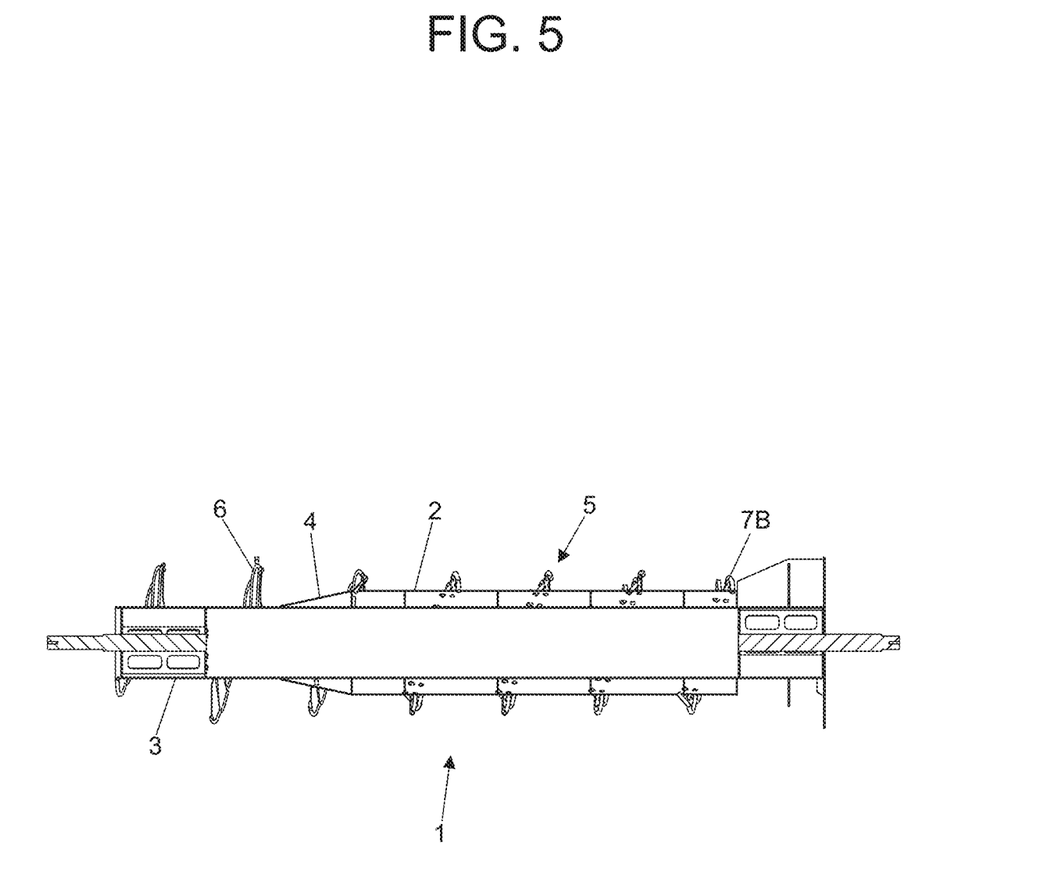
FIG. 5: cutaway side view of the threshing cylinder.

The IMPROVED GRAIN THRESHING DEVICE, object of this application for patent of invention, comprises a device composed of a cylinder (1) (FIG. 1 and FIG. 4) with different diameters, i.e. larger diameter zone (2) and smaller diameter zone (3), said larger or smaller diameter zones intermediated by a transition zone (4), the aforementioned cylinder (1) being driven by an external power source that rotates it on bearings (not represented).

Figure 1:
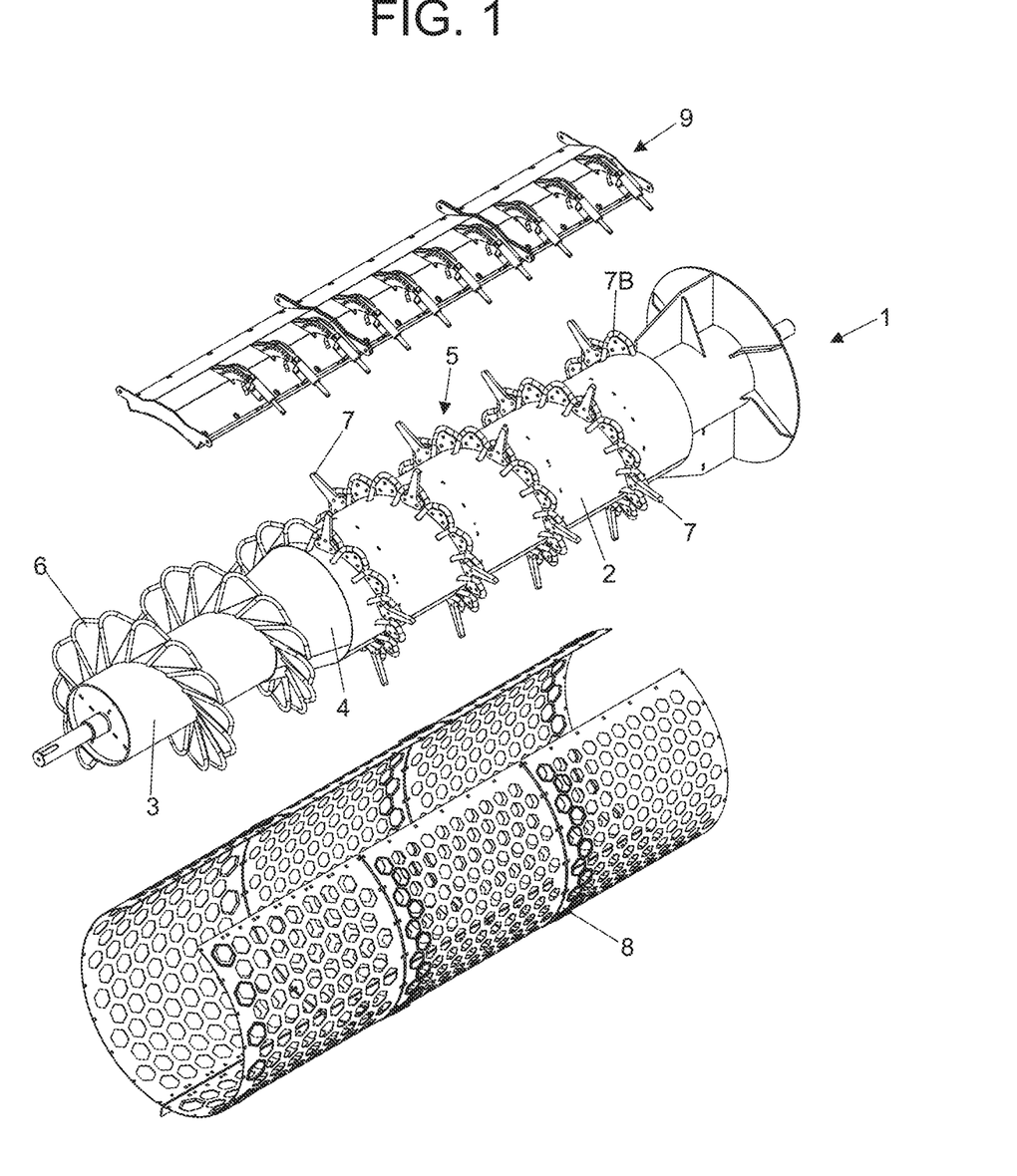
FIG. 1: perspective view of the threshing system, with details of the components.

The threshing cylinder (1) is endowed with a helicoid (5) having a segmented and overlapping profile and interchangeable flexible elements (7), and in the smaller diameter zone (3) the helical path is contoured by scale-like rigid components type scales (6) as far as part of the transition zone (4), where soon afterwards a helical path begins, contoured by substantially upside-down U-shaped elements (7B), and the flexible elements (7) can be arranged in consecutive way or interspersed, as represented in FIG. 1.

The cylinder (1) or rotor is enveloped by the sieve (8) or concave, which is a material in the form of suitably perforated screen; above the cylinder (1) is the set of fins (9), having mechanical, electrical or hydraulic drive. In the constructive version presented in this invention, the mechanical construction, where a manual trigger (10) has fit points (11) on a plate (12), so that a flap (13) is driven to draw near to (FIG. 3 left side) or pull away from (FIG. 3 right side) the scales (6) or flexible elements (7).

Figure 3:
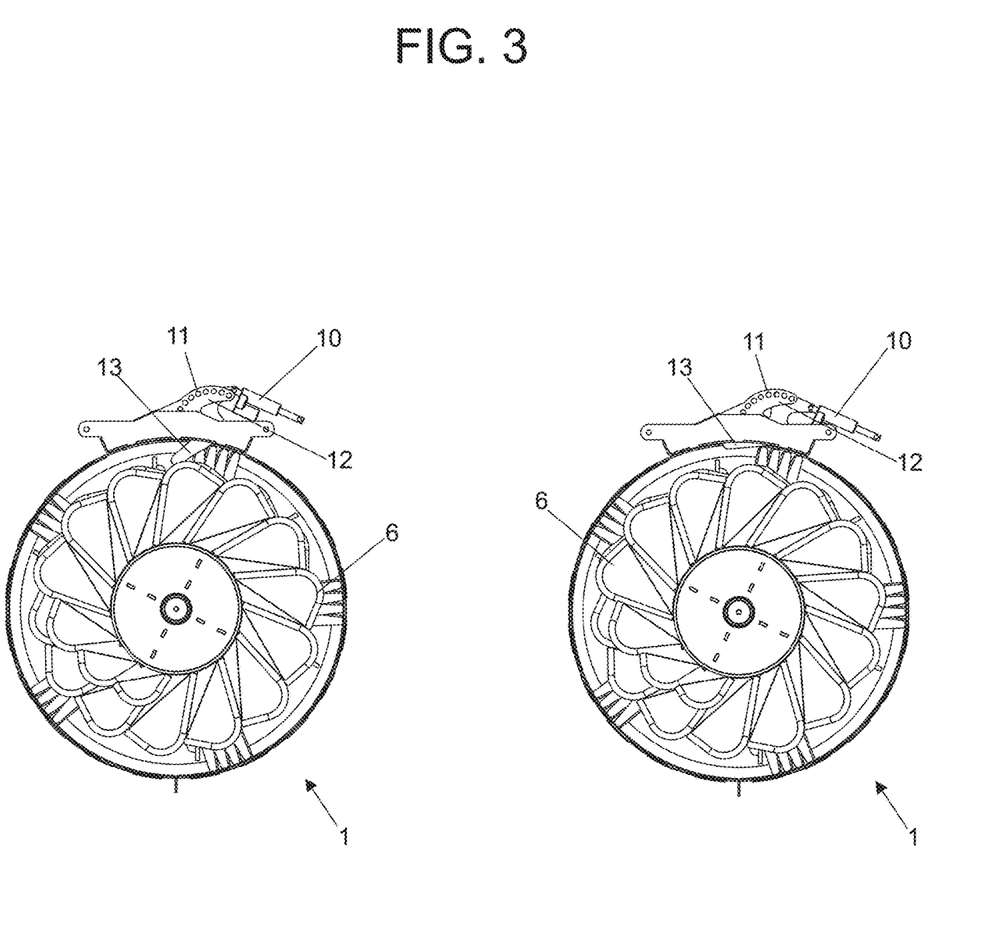
FIG. 3: front view of the combination with detail of fin adjustment mechanism.

As stated above, the pivoting effect of the manual trigger (10), in this construction carried out mechanically, can be achieved through hydraulic, pneumatic or electric effect, in order to produce the motion necessary to adjust the fin (13) in relation to the other elements of the cylinder (1).

Figure 2:
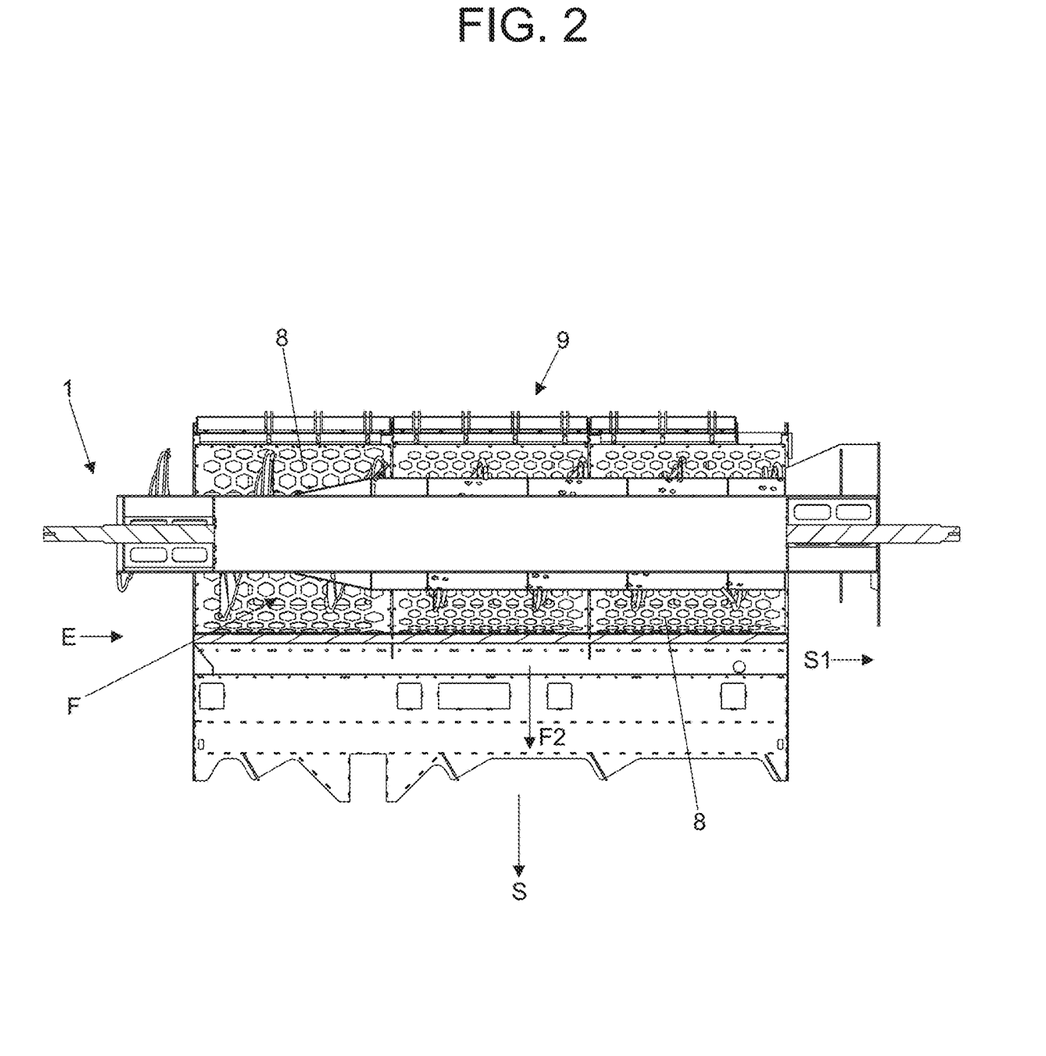
FIG. 2: longitudinal view with sieve or concave, showing the flow of material along the cylinder.

FIG. 2 shows the cylinder (1) with the sieve (8) or concave and the set of fins (9), the material input (E), the material flow (F), the grain output (S) and the tailings output (S1) also being identified.

Figure 6:
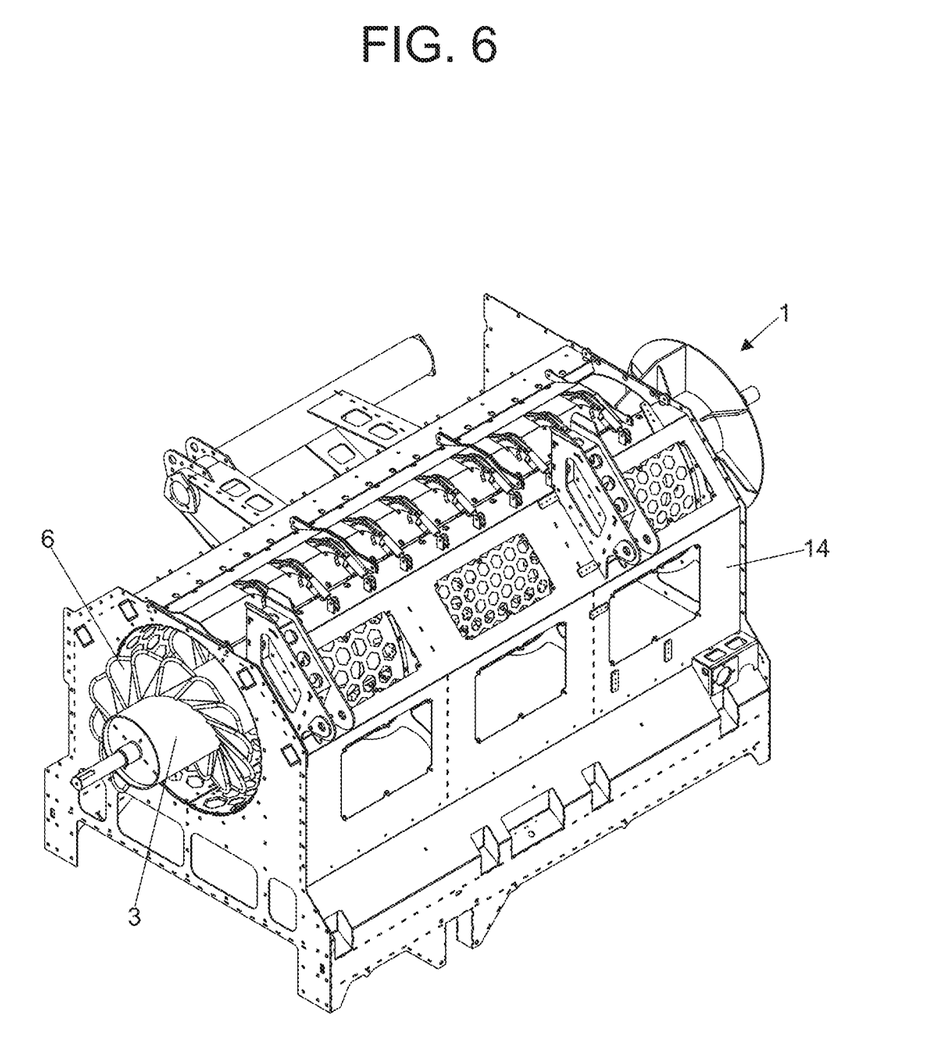
FIG. 6: perspective view of the threshing cylinder applied to the structure which is positioned on the grain harvester.
Figure 7:
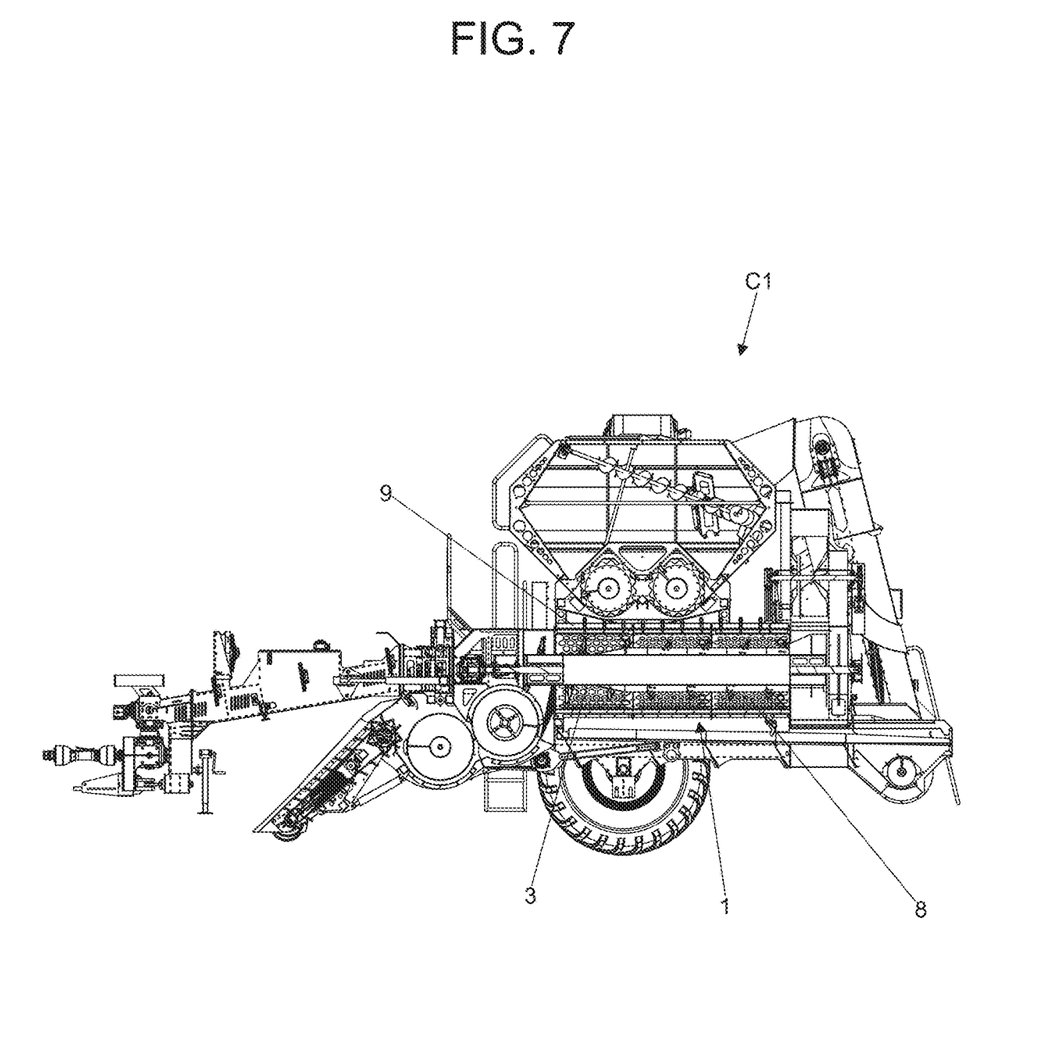
FIG. 7: cutaway side of the grain harvester with the positioning of the threshing combination.
Figure 8:
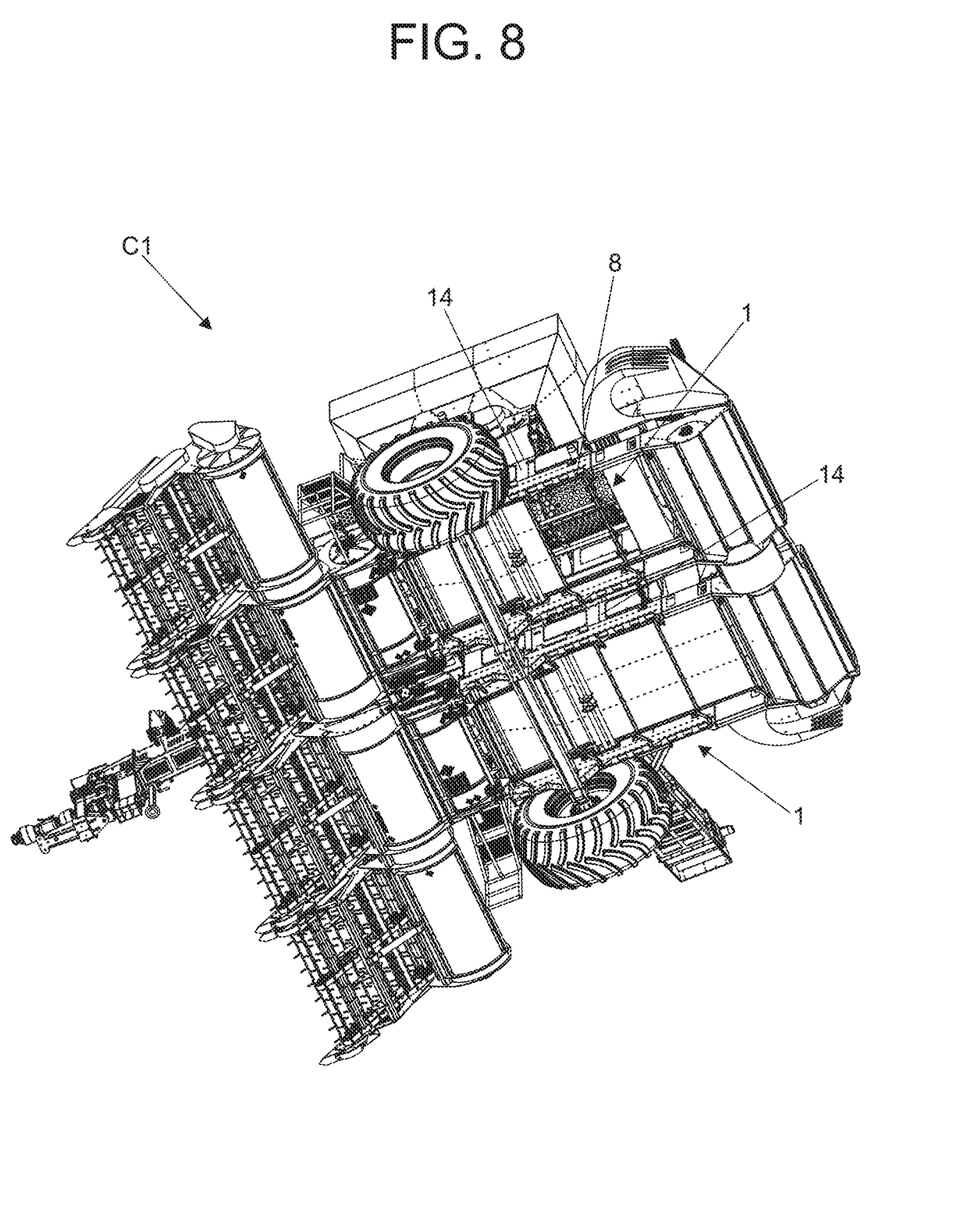
FIG. 8: perspective view of the threshing cylinder coupled to the grain harvester.

FIG. 6 shows the cylinder (1) seated in the structure (14) which is coupled to the grain harvester (C1) according to FIGS. 7 and 8 so that the cylinder (1) is fed by the movement of the grain harvester (C1).

The flexible elements (7) are made of material with relative flexibility and designed, in association with the other components, to promote the efficient cleanup of the concave screen without damaging the grains.

According to the invention, the material to be processed enters the system by a material input (E) and is processed by the rotary motion of the cylinder (1) against the sieve (8), as shown in FIGS. 1 and 2.

On this path, part of the flow of material (F), that is, the grains and the finer impurities pass through the sieve (8) or also called concave and follow a vertical downward flow (F2), as shown in FIG. 2.

The other part of the flow (F), that is, the coarser tailings, are unable to pass through the sieve (8) and so are directed to opposite end in a material flow (F) horizontally backwards, as shown in FIG. 2, with the aid of the helicoid (5) of the cylinder (1).

As stated earlier, the mechanism located in the upper part of the system called set of fins (9), as shown in FIG. 1, is responsible for controlling the speed of the material flow (F) horizontally backwards of the material. This is done through the advance and retreat of a fin (13) in radial direction, shown in FIG. 3, in order to approach or move away from the cylinder (1).

The adjustment of the fins (13) can be performed mechanically or through an actuator (electric or hydraulic) individually or together. It is thus possible to vary the speed at which this flow (F) passes through the sieve (8) allowing the system to adapt better to the changes of the characteristics of the material collected.

The invention includes, therefore, a threshing system with rotor whose helicoid (5) consists of rigid components with fish-scale type geometry (6) and flexible material, which maintains the integrity of the threshed grains and minimizes grain damage (6).

Further, the speed regulation system of the threshing flow is made through the advance or retreat of fins (13) on the rotor or helicoid (5), this procedure having the function of retaining more or less threshed material depending on the crop conditions and enabling better adaptation of the system to various harvesting conditions.

With such characteristics, the invention meets virtually all the market needs, focusing on the most critical variables when it comes to grain threshing, having the use of three zones: a larger diameter zone area (2), a smaller diameter zone (3) and a transition zone (4), the latter having a slightly truncated-cone shape configuration, in order to distribute and concentrate the scales (6) in a region that is positioned between the smaller diameter zone (3) and the transition zone (4), while the flexible elements (7) are concentrated in greater diameter zone (2).

This configuration of the helicoid (5) and other components, as well as the sieve construction (8) in association with the set of fins (9), are crucial for the efficiency of the threshing system, making it possible to control the forward flow of the material to be threshed without damaging it. These features are innovative in this type of equipment.

The invention claimed is:
1. A grain threshing device, comprising:
a device composed of a cylinder (1) rotated by external power source;
wherein the cylinder (1) has different diameters and said cylinder being endowed with a helicoid (5) having a segmented overlapping profile and enveloped by a sieve (8) or concave;
wherein the cylinder (1) has a larger diameter zone (2) and a smaller diameter zone (3), said larger or smaller diameter zones intermediated by a transition zone (4); and
wherein in the smaller diameter zone (3), a helical path is contoured by rigid scale-like components (6) as far as part of the transition zone (4), and adjacently a helical path begins, contoured by substantially upside-down U-shaped elements (7B) and flexible elements (7) arranged in consecutive way or interspersed with respect to one another.
2. The grain threshing device of claim 1, wherein a set of fins (9) is adapted surrounding the outer surface of the cylinder (1).
3. The grain threshing device of claim 2, wherein the mechanical set of fins (9) has a manual trigger (10) that has fit points (11) on a plate (12), so that a fin (13) is driven to draw near to or pull away from the scales (6) or flexible elements (7) of the cylinder (1).
4. The grain threshing device of claim 3, wherein the set of fins (9) is optionally hydraulic or electric.
5. The grain threshing device of claim 2, wherein the cylinder (1) with the sieve (8) and the set of fins (9) have a material input (E), a material flow (F), a grain output (S) and a tailings output (S1).
6. The grain threshing device of claim 1, wherein the cylinder (1) is applied to the structure (14) which is seated in the grain harvester (C1), so that the cylinder (1) is fed by the movement of the grain harvester (C1).

* * * * *